US010560956B2

(12) United States Patent
Bhushan et al.

(10) Patent No.: US 10,560,956 B2
(45) Date of Patent: Feb. 11, 2020

(54) PRIORITY INDICATION FOR COMMUNICATION OVER SHARED ACCESS SYSTEMS

(71) Applicant: QUALCOMM Incorporated, San Diego, CA (US)

(72) Inventors: Naga Bhushan, San Diego, CA (US); Juan Montojo, San Diego, CA (US); Taesang Yoo, Riverside, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 210 days.

(21) Appl. No.: 15/481,299

(22) Filed: Apr. 6, 2017

(65) Prior Publication Data

US 2018/0295639 A1    Oct. 11, 2018

(51) Int. Cl.
*H04W 72/12* (2009.01)
*H04W 72/04* (2009.01)
(Continued)

(52) U.S. Cl.
CPC ....... *H04W 72/1247* (2013.01); *H04J 3/1694* (2013.01); *H04W 72/0446* (2013.01); *H04W 88/02* (2013.01)

(58) Field of Classification Search
CPC ......... H04W 72/0446; H04W 72/1257; H04W 74/0875; H04W 88/02; H04J 3/1694
See application file for complete search history.

(56) References Cited

U.S. PATENT DOCUMENTS

2016/0242031 A1    8/2016  Ojanen et al.
2016/0295419 A1    10/2016 Avestimehr et al.
(Continued)

FOREIGN PATENT DOCUMENTS

CN    104185280 A    12/2014
WO    2016182634 A1  11/2016
(Continued)

OTHER PUBLICATIONS

International Search Report and Written Opinion—PCT/US2018/020959—ISA/EPO—dated May 30, 2018.

*Primary Examiner* — Khaled M Kassim
*Assistant Examiner* — Saad A. Waqas
(74) *Attorney, Agent, or Firm* — Arent Fox LLP; Kevin M. Donnelly

(57) ABSTRACT

A method or apparatus for wireless communication at a scheduling entity communicating with a plurality of devices over a plurality of links in a shared spectrum in a way to avoid undue interference among the plurality of links. The apparatus receives a set of priority indicators, each priority indicator corresponding to time varying priorities for communicating over the plurality of links. The apparatus assigns each of the plurality of links a subset of the set of priority indicators. Each priority indicator maps to a time varying priority level for the communication during each of a plurality of frames. The apparatus may also receive an indication of a mapping function for determining the corresponding priority level for each priority indicator according to a frame number. Links assigned disjoint priority indicators may have TDM transmissions, whereas links having an overlapping priority indicator may have simultaneous transmissions.

25 Claims, 13 Drawing Sheets

(51) Int. Cl.
*H04J 3/16* (2006.01)
*H04W 88/02* (2009.01)

(56) References Cited

U.S. PATENT DOCUMENTS

| | | | |
|---|---|---|---|
| 2016/0338098 A1 | 11/2016 | Li et al. | |
| 2016/0360419 A1 | 12/2016 | Zapanta et al. | |
| 2018/0219642 A1* | 8/2018 | Fakoorian | H04B 7/0413 |
| 2018/0219654 A1* | 8/2018 | Chen | H04L 5/0012 |

FOREIGN PATENT DOCUMENTS

| WO | 2017204992 A1 | 11/2017 |
|---|---|---|
| WO | 2018022229 A1 | 2/2018 |
| WO | 2018084994 A1 | 5/2018 |

\* cited by examiner

PRIORITY INDICATION FOR COMMUNICATION OVER SHARED ACCESS SYSTEMS

BACKGROUND

Field

The present disclosure relates generally to communication systems, and more particularly, to interference management and prioritized communication over shared spectrum systems, dynamic time division duplex (TDD) systems, and unplanned heterogeneous network (HetNet) systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

A wireless communications system may operate over a shared spectrum, meaning that the wireless communications system includes one or more frequency bands that may be shared by multiple network operators (e.g., multiple network operating entities). In some instances, sharing of the frequency bands may include subdividing the frequency bands into ever-smaller bands dedicated for use by specific network operators. In other instances, at least portions of band spectrum may be available for use by more than one network operator.

In order to avoid interference between different devices, use of the available band spectrum may be subject to a contention procedure that may involve the use of a medium-sensing procedure. For example, the wireless communications system may employ medium-sensing procedures, such as listen-before-talk (LBT), to ensure a particular channel is clear before transmitting a message. Additional procedures are desirable for allocating and using shared spectrum between network operators in a way that avoids interference between different devices.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A wireless communications system may operate over a shared spectrum in which one or more frequency bands may be shared by multiple network operators. One challenge of shared spectrum communication is avoiding interference between different devices, whether the devices are operated by the same network operator or by different network operators. The present application provides a way to assist in avoiding interference on a shared spectrum through the use of a set of priority indicators that may be assigned to each of multiple network operators by a Spectrum Access Server (SAS) or core network operator. The network operators then assign a subset of the set of priority indicators to each link served by the operator. The priority indicator corresponds to a time varying priority level for communication over a link. For example, the priority indicator may map to a changing priority level for communication over a link during each of a plurality of frames. When a first subset of priority indicators assigned to a first link is disjoint from a second subset of priority indicators assigned to a second link, communication may not coexist on the two links. For example communication on one link may cause an unacceptable amount of interference to the other link. Thus, communication on the two links may be required to be time division multiplexed (TDM). In contrast, if there is at least one overlapping priority indicator in the first subset assigned to the first link and the second subset assigned to the second link, communication may be transmitted simultaneously over the two links.

By allocating priority in this way to each network operator, and in turn to each link served by the network operator, operators may efficiently communicate over shared spectrum by providing access to the shared spectrum for multiple devices while reducing interference among devices.

In an aspect of the disclosure, a method, a computer-readable medium, and an apparatus are provided for wireless communication at a scheduling entity communicating with a plurality of UEs over a plurality of links. The apparatus receives a set of priority indicators, the priority indicators corresponding to time varying priorities for communicating over the plurality of links from a system access server. The apparatus assigns each of the plurality of links a subset of the set of priority indicators, wherein each priority indicator maps to a time varying priority level for the communication during each of a plurality of frames. The apparatus may also receive an indication of a mapping function for determining the corresponding priority level for each priority indicator according to a frame number.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
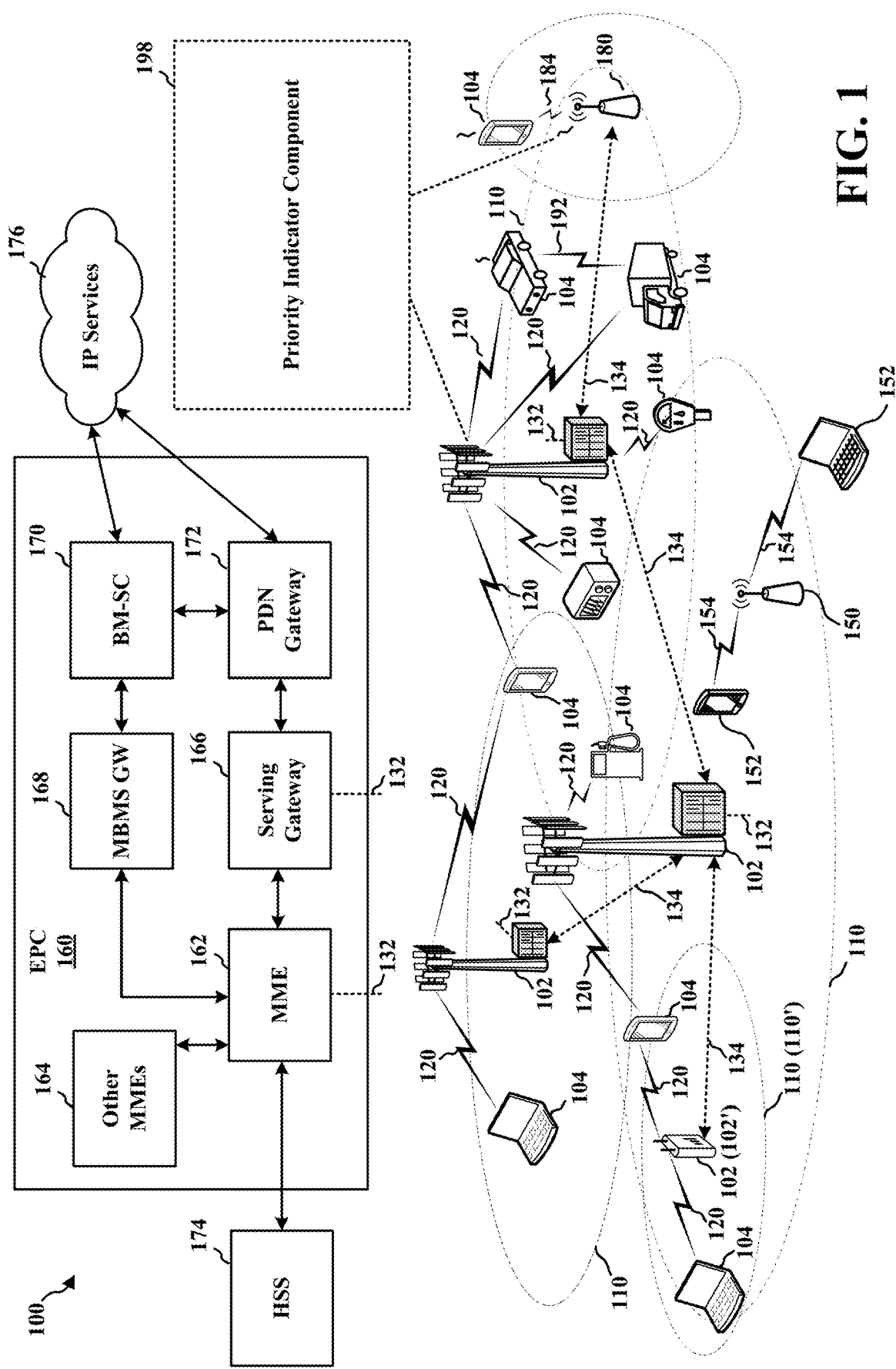
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include base stations. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100 MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

The gNodeB (gNB) 180 may operate in millimeter wave (mmW) frequencies and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 184 with the UE 104 to compensate for the extremely high path loss and short range.

Additionally, the wireless communication system 100 may involve communication 192 directly between UEs 104.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a gNB, Node B, evolved Node B (eNB), an access point, a base transceiver station, a radio base station, a radio transceiver, a transceiver function, a basic service set (BSS), an extended service set (ESS), or some other suitable terminology. The base station 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a toaster, or any other similar functioning device. Some of the UEs 104 may be referred to as IoT devices (e.g., parking meter, gas pump, toaster, vehicles, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the base stations 102 may receive a set of priority indicators, the priority indicators corresponding to time varying priorities for communicating over a plurality of links from a system access server. The base stations 102/180 may be configured with a priority indicator component (198), e.g., that assigns a subset of the received set of priority indicators to each of the links served by the base station, e.g., as described in connection with FIGS. 4-11. Each priority indicator may map to a corresponding priority level for the communication during each of a plurality of frames Base station 102/180 may comprise the aspects described in connection with FIGS. 11 and 12. The base station may obtain the priority indicator(s) via the backhaul coordination or the central coordination entity such as SAS. UEs may be configured with a priority indicator by the eNB configuration.

Figure 2:
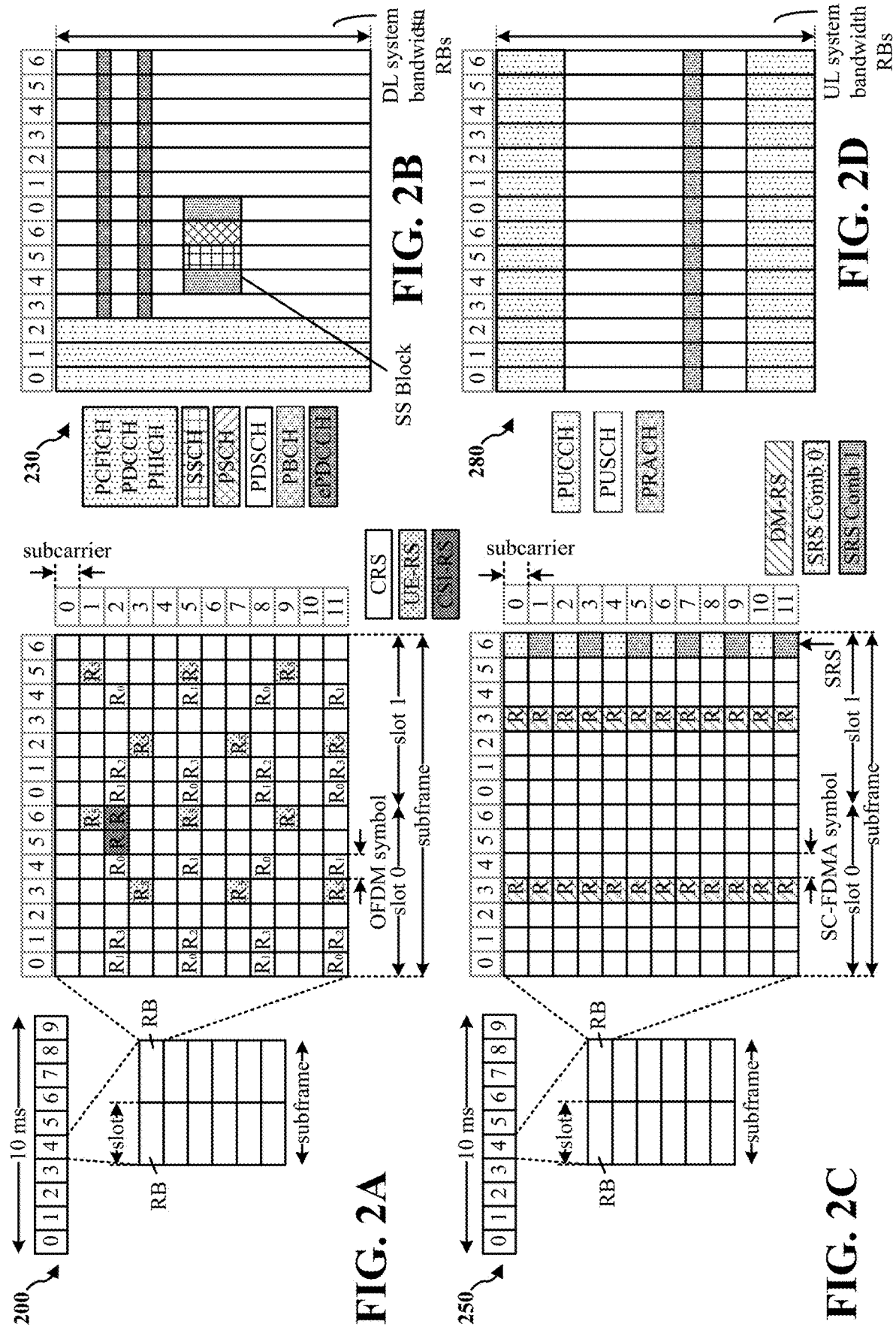
FIGS. 2A, 2B, 2C, and 2D are diagrams illustrating examples of a DL frame structure, DL channels within the DL frame structure, an UL frame structure, and UL channels within the UL frame structure, respectively.

FIG. 2A is a diagram 200 illustrating an example of a DL frame structure. FIG. 2B is a diagram 230 illustrating an example of channels within the DL frame structure. FIG. 2C is a diagram 250 illustrating an example of an UL frame structure. FIG. 2D is a diagram 280 illustrating an example of channels within the UL frame structure. Other wireless communication technologies may have a different frame structure and/or different channels. A frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). For a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (NACK) feedback based on the physical uplink shared channel (PUSCH). The primary synchronization channel (PSCH) may be within symbol 6 of slot 0 within subframes 0 and 5 of a frame. The PSCH carries a primary synchronization signal (PSS) that is used by a UE to determine subframe/symbol timing and a physical layer identity. The secondary synchronization channel (SSCH) may be within symbol 5 of slot 0 within subframes 0 and 5 of a frame. The SSCH carries a secondary synchronization signal (SSS) that is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DL-RS. The physical broadcast channel (PBCH), which carries a master information block (MIB), may be logically grouped with the PSCH and SSCH to form a synchronization signal (SS) block. The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the base station. The UE may additionally transmit sounding reference signals (SRS) in the last symbol of a subframe. The SRS may have a comb structure, and a UE may transmit SRS on one of the combs. The SRS may be used by a base station for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
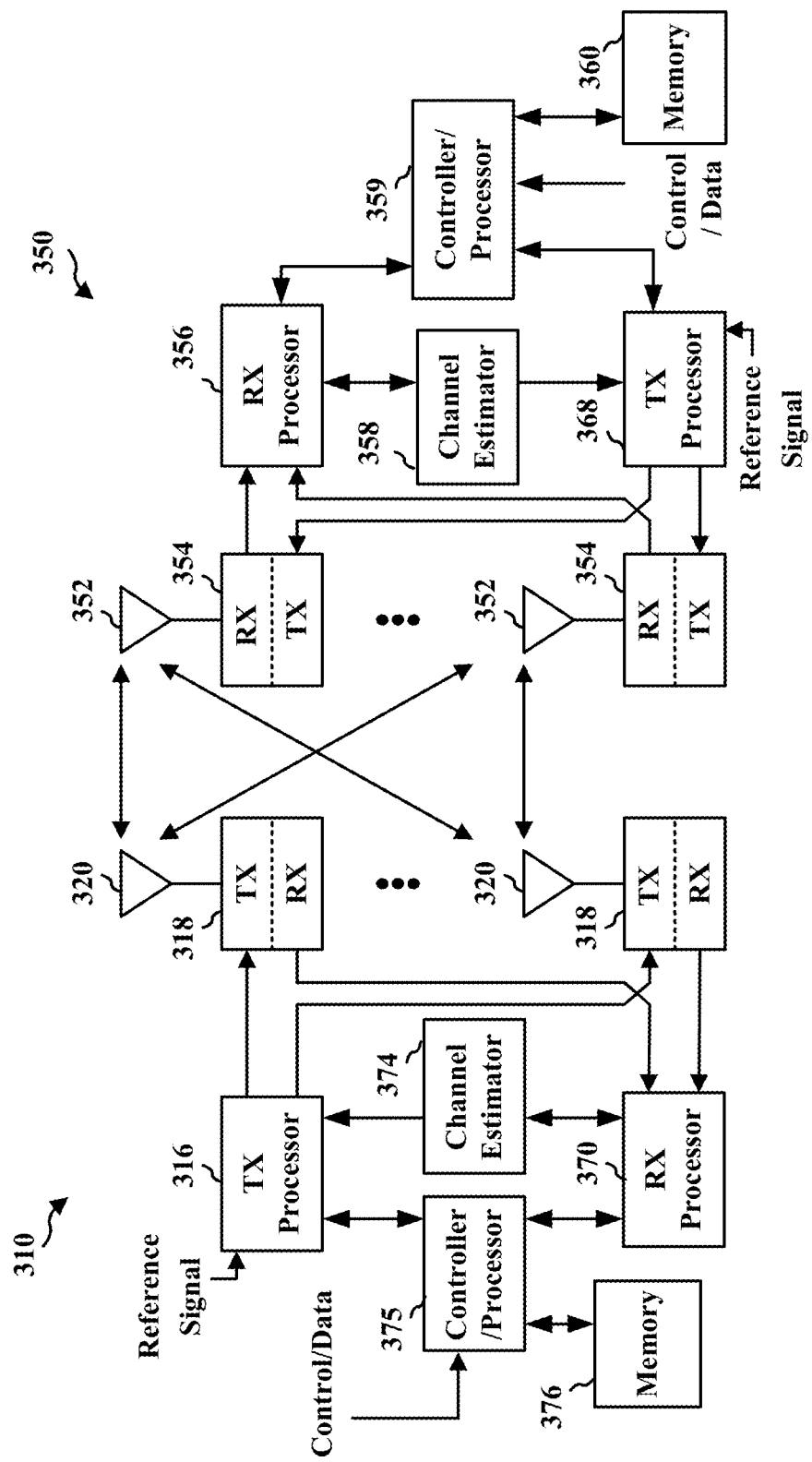
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
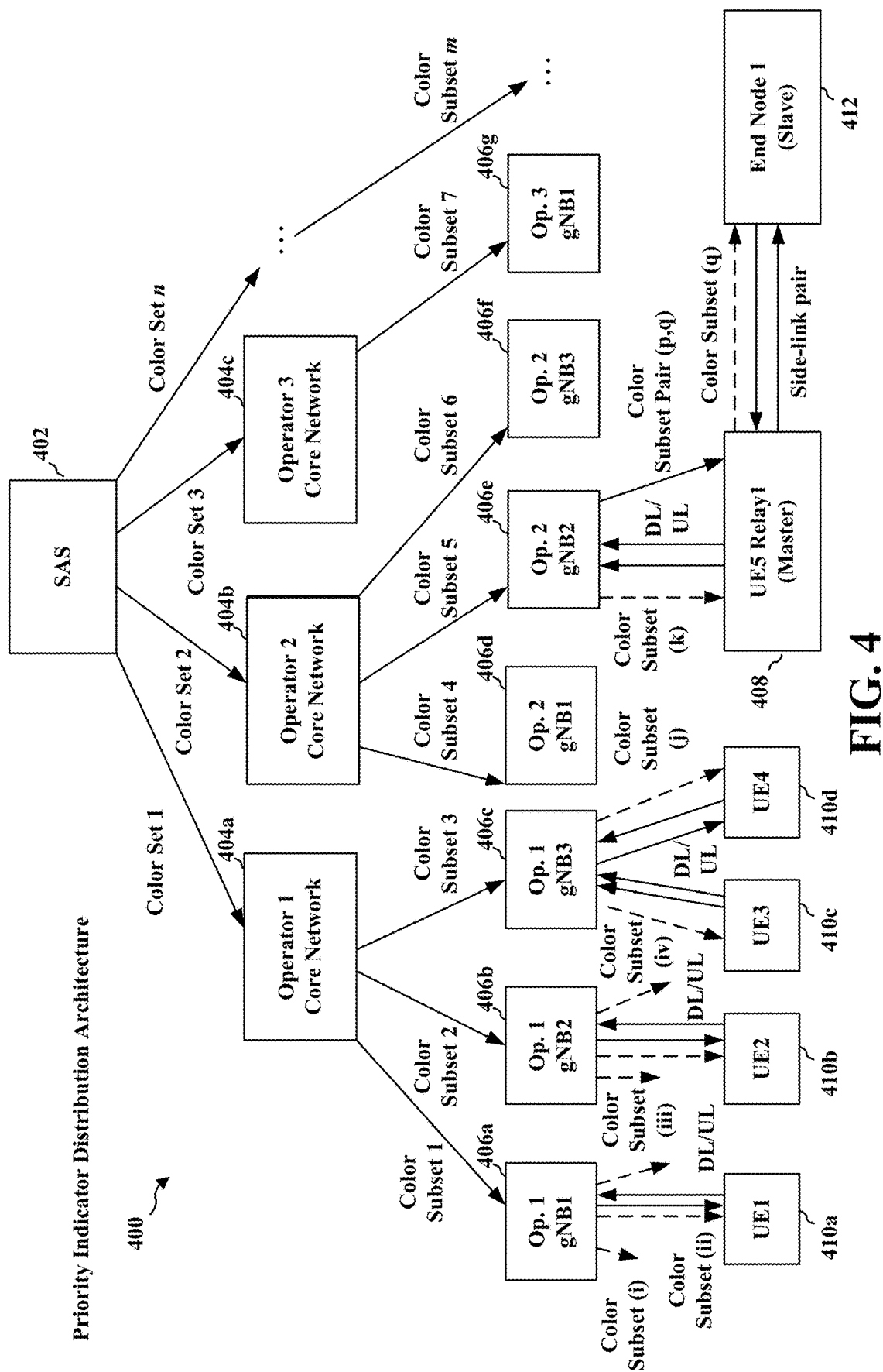
FIG. 4 illustrates an example of a shared spectrum system having assigned set and subsets of priority indicators.

FIG. 4 illustrates an example shared spectrum system 400 comprising a SAS 402. The SAS enables coexistence with legacy or incumbent deployments and facilitates timing synchronization across all nodes (e.g., 406a, 406b, 406c, 406d, 406e, 406f, 406g) operating in the shared spectrum under the SAS 402. The SAS may also provide frame level synchronization throughout the multi-operator deployment, e.g., based on Global Positioning System (GPS), Global Navigation Satellite System (GNSS), Network Time Protocol (NTP), etc.

As described herein, the SAS may distribute sets of at least one indicator, e.g., a priority indicator, to different operators. In FIG. 4, the sets of indicators distributed by the SAS, are referred to as "color sets" (e.g., color set 1, color set 2, color set 3, . . . , color set n). Although "color" is used in this example as a description for the indicator, various descriptions may be used for the indicators, e.g., the indicators are is referred to herein as "priority indicators." The priority indicator may also be referred to as a tag, a label, a field, an index, a number, a value, a rank, etc. that corresponds to a time varying priority level that may be associated with a link. In one example, a priority indicator may be referred to as a "color."

In FIG. 4, the SAS 402 distributes indicator sets priority indicator set 1 to operator 1, priority indicator set 2 to operator 2, priority indicator set 3 to operator 3, and so forth up to priority indicator set n. Operator 1, operator 2, operator 3, etc. are core network operators. In turn, operators 1-3, assign priority indicator subsets to each of their scheduling entities 406a-g. For example, Operator 1 404a received an assignment of priority indicator set 1 from SAS 402. Operator 1 404a then assigns subset 1 from the priority indicator set 1 to scheduling entity 406a, subset 2 of the priority indicator set 1 to scheduling entity 406b, and priority indicator subset 3 of priority indicator set 1 to scheduling entity 406c. Priority indicator subset 4, priority indicator subset 5, and priority indicator subset 6 are similarly subsets of priority indicator set 2 assigned by operator 2 404b to scheduling entities 406d, 406e, 406f, respectively. Priority indicator subset 7 is a subset of priority indicator set 3 assigned by Operator 3 404c to scheduling entity 406g.

Each scheduling entity assigns at least one priority indicator, from its own assigned subset, to each link managed by the operator/scheduling entity. The link may also referred to as a meta-link. A link may comprise an ordered pair, e.g., transmission and reception, along with a signal type. Examples of signal types for a link may include control best effort data, mission critical data, data based on QoS class of traffic, etc. An example of an ordered pair includes, e.g., a gNB-UE pair for downlink and a UE-gNB pair for uplink. Another example of a scheduling entity is a relay, which may schedule communication for pairs of sidelinks. The end nodes for a relay sidelink a master 408 and a slave 412. Each such ordered pair may have different signal types in order to form multiple meta-links.

Links with disjoint priority indicators, or disjoint values, may be restricted to being time division multiplexed (TDM) with each other, in order to protect one of the links from severe cross-link interference. Full-duplex issues and self-interference issues, e.g., may be ignored in the TDM assignment. Links with overlapping priority indicator subsets may potentially operator simultaneously, e.g., subject to self-interference or full-duplex considerations. Subsets are considered to be overlapping if the subsets share at least one priority indicator. Thus, if two links have no priority indicators or indicator values in common, the links may be limited from transmitting communication at the same time. If at least one indicator value in the set of priority indicators assigned to the two links is the same, the links may both transmit communication that overlaps in time. Thus, two meta-links can coexist if their assigned indicator subsets have a non-empty intersection.

Each operator 404*a-c*, 406*a-g*, 408 may assign priority indicator subsets, drawn from its own assigned set of priority indicators, to different meta-links belonging to the operator. The assignment may be based on an interference topology, jamming information, or signal characteristics, etc. An interference topology may comprise jamming graphs measured by or reported to the scheduling entity from UEs through RRM procedures. Example signal characteristics that may be a basis for the assignment of priority indicators may include, e.g., downlink control signals, uplink control signals, single carrier frequency division multiplexed (SC-FDM)/orthogonal frequency-division multiplexed (OFDM) data, best effort (BE)/mission critical (MC) traffic type, etc. Such interference topology information or signal characteristics used as a basis for the assignment of subsets of priority indicators to links may be semi-statically updated at the scheduling entity, e.g., based on measurements made by the UE and reported to the scheduling entity.

In one example, by default, different operators 404*a-c* may be assigned disjoint sets of indicator values from the SAS 402. However, in other examples, different operators may be assigned overlapping sets of priority indicators, when communication under such operators may coexist.

Each indicator value may correspond to a time varying priority value for transmitting communication over the link in relationship to the other links. For example, each indicator value may correspond to a varying priority level for each frame. A mapping function may provide a priority value according to each indicator value for each frame. For example, a priority mapping function, f, may provide $$\text{Frame-number } x \text{ indicator value} \rightarrow \text{Priority}\{\text{Null}, 1, 2, 3, \ldots, P\} \quad \text{F:}$$

As an example, at any given time-slot, at most one priority indicator may be mapped to a non-null priority.

Each operator 404*a-c*, may pass on the priority function $f$ to each of the scheduling entities 406*a-g*, 408 in its deployment. Different channels/bands, e.g., channels/bands that are disjoint or isolated, may have different priority functions.

For any communicating node-pair, priority indicator subsets associated with each of the two or more meta-links between the given nodes may be explicitly provided only to the scheduling entity of the node-pair. For example, priority indicator subsets might be provided explicitly to gNBs 406*a-g* but not explicitly to UEs 410*a-410d*. gNBs 406*a-g* may correspond to gNB 180 in FIG. 1. Similarly, the priority indicator subsets might be provided explicitly to the master node 408 for side links, but not to the slave node 412. The scheduling entity may manage the priority indicator subsets on behalf of its slave-nodes, on meta-links where the slave node is the transmitter. Thus, the priority indicator subsets might only be conceptually passed down to the slave nodes. Priority information may be provided to the UEs/slave nodes regarding communication over the link served by the base station/master node.

Although only gNBs and relays are illustrated as scheduling in FIG. 4, scheduling entities may comprise other types of base stations may also apply the aspects described herein. For example, FIG. 5 illustrates an example with pico base stations and macro base stations.

Figure 5:
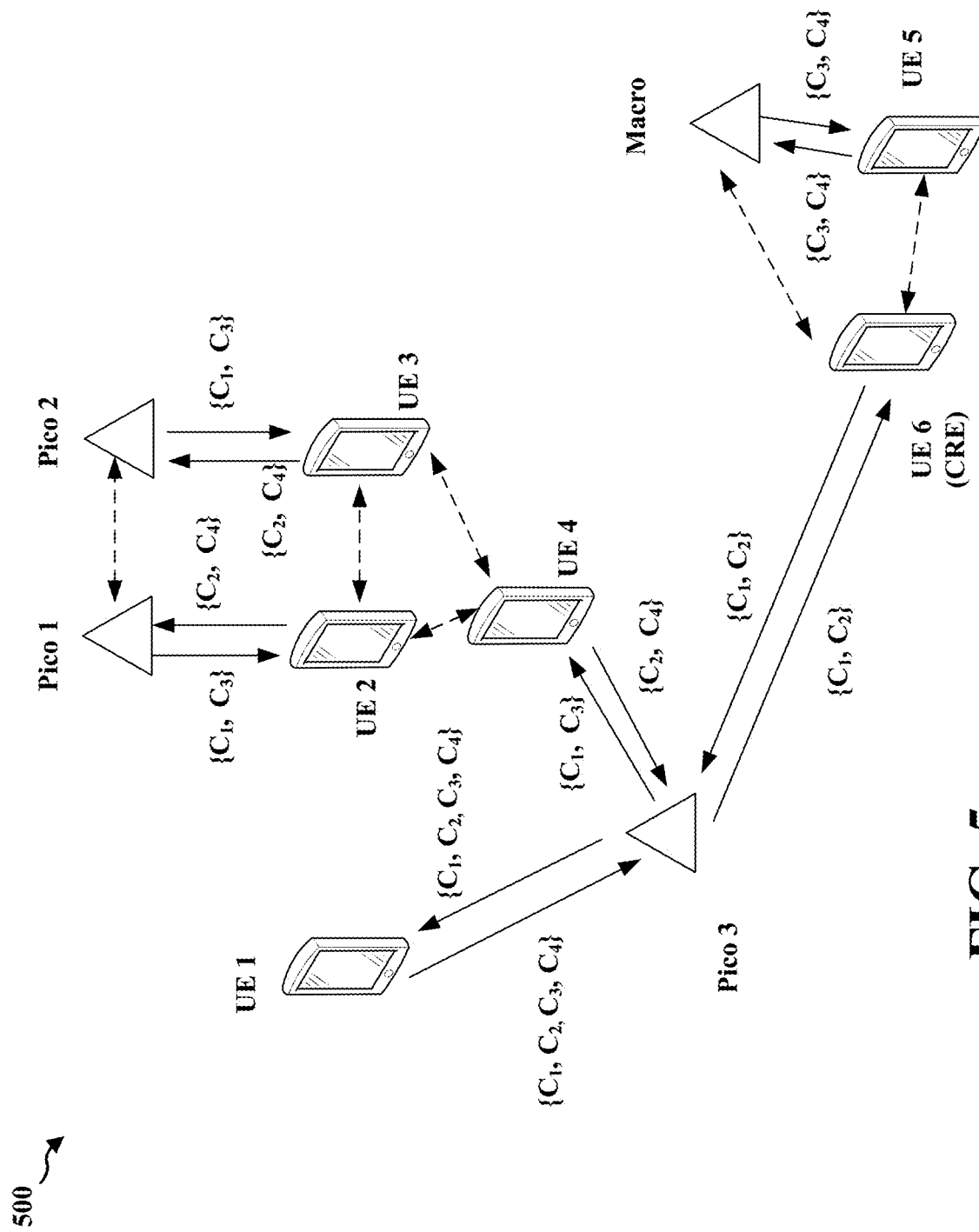
FIG. 5 illustrates an example of a shared spectrum system using assigned priority indicators for links.

FIG. 5 illustrates an example priority indicator subset assignment in a single operator, dynamic TDD, HetNet deployment 500. TDD separates downlink and uplink signals in time. Dynamic TDD enables adjustments of uplink and downlink resources flexibly according to communication traffic needs. The amount of uplink and downlink slots may be dynamically adjusted by changing a TDD configuration. A HetNet may involve a communications network comprising a combination of different cell types and different access technologies.

For example, the single operator deployment may be under a single operator in a core network, e.g., any of Operator 1 404*a*, Operator 2 404*b*, Operator 3 404*c* from FIG. 4. The set of priority indicators assigned to the operator from the SAS may include a set of $\{c_1, c_2, c_3, c_4\}$. Each link may be assigned a subset of the set of priority indicators. While three priority indicators may be enough to avoid interference, a fourth priority indicator may improve fairness, e.g., between Pico base stations, e.g., Pico 1 and Pico 2.

For example, the priority indicators assigned between Pico 1 and UE 2 are $\{c_1, c_3\}$ for the downlink and $\{c_2, c_4\}$ for the uplink. Similarly, the priority indicators assigned between Pico 2 and UE 3 are also $\{c_1, c_3\}$ for the downlink and $\{c_2, c_4\}$ for the uplink. Thus, as the downlink for UE 2 and the downlink UE 3 have overlapping priority indicators, communication on these meta-links between UE 2 and Pico 1 and between UE3 and Pico 2 may co-exist. In contrast, the uplink between UE 2 and Pico 1 cannot coexist with the downlink between UE 3 and Pico 2, e.g., due to interference between the meta-links. These meta-links do not comprise any overlapping priority indicators, e.g., the uplink between UE 2 and Pico 1 has $\{c_2, c_4\}$ whereas the downlink between UE 3 and Pico 2 has $\{c_1, c_3\}$. The communication over these links may be restricted to be TDM in order to protect one of the links from inter-node interference through the assignment of disjoint priority indicators.

In FIG. 5, UE 5 is being served by a macro base station (Macro). While UE 6 may be close to the macro base station, UE 6 is served by Pico 3. UE 6 may be in a range extended region of Pico 3. The communication on meta-links between UE 6 and Pico 3 may not coexist with communication on the meta-links between UE 5 and the macro base station. The communication for these links may be restricted to being TDM based on the assignment of disjoint priority indicators. In the example in FIG. 5, the uplink and downlink meta-links between the macro base station and UE 5 are assigned $\{c_3, c_4\}$, whereas the uplink and downlink meta-links between Pico 3 and UE 6 are assigned $\{c_1, c_2\}$.

The time varying priority function $f$ may be based on frame number, e.g., t, and priority indicator, e.g. one of set $\{c_1, c_2, c_3, c_4\}$ in FIG. 5. For example, the time varying function may be represented by $f$(t, priority indicator) =priority for the link for frame t. The time varying priority function may be configured by the SAS and may be provided to all scheduling entities, e.g., to base stations such as gNB 406a-g, master nodes 408, etc.

In an example, a non-zero priority may be assigned through the function $f$ to one priority indicator at any given CCA frame. Each priority indicator will be associated with a priority level for a given time. If the priority is null, no medium access may be allowed over the given CCA frame.

At any frame-number t, the priority of a meta-link may be the best priority of all priority indicators in its subset for that frame number. For example, the priority may be determine based on:

Priority(link)=best_$\{NULL, f(t,c)\}$. This means that a given link may be associated with multiple priority indicators and each priority indicator may correspond to a priority at a given time. The priority of the link may be the best of all the priorities associated with all the priority indicators. The best priority level of the link may be NULL in some frames depending on the priority mapping function $f(t,c)$.

In the example of FIG. 5, if $c_1$ had a higher level and $c_3$ had a lower priority level for a first frame, then the downlink between Pico 1 and UE 2 would be the higher priority level for $c_1$ for the first frame. In a second frame, $c_3$ may have the higher priority level. Thus, for the second frame, the priority level for the downlink between Pico 1 and UE 2 may correspond to the higher priority level for $c_3$ rather than the priority level for $c_1$.

For a given priority indicator, e.g., $c_1, c_2, c_3, \ldots, c_n$, the mapping of frame-numbers to a priority level may follow a pattern, such as a round-robin sequence that enables each priority indicator to have a higher level of priority and a lower level of priority at some frame within the sequence. Such a pattern may provide equal or similar levels of access to different operators. The pattern may also be based on a pseudo-random sequence that gives a higher level of priority to some priority indicators over others. For example, different levels of priority may be negotiated between an operator and the SAS in order for the operator to gain more access to the spectrum. For example, a probability P(c) that the priority function that maps the priority of priority indicators to a given time to a certain priority, such as highest priority, e.g., P(c)=Probability ($f$(t, priority indicator))=1, may be negotiated or otherwise planned between the operator and the SAS. In this example, the priority pattern would not be completely random and may provide the operator a higher number of subframes with a higher level priority in order to give that operator more access to the spectrum. For example, a higher probability of priority P(c) may be provided for more expensive or more critical access to the spectrum. Thus, one operator may have a higher level of priority and higher access to the spectrum and other operators may have varying levels of lower priority for lower access to the spectrum. The priority function may be shaped, e.g., by the SAS, to provide an equal levels of access to the spectrum or to support preemptive priority to certain types of traffic over others.

Within an operator, a similar type of probability of priority may be applied to particular links. For example, an operator who wants to support Mission-critical service, e.g., Ultra-Reliable and Low-Latency Communications (UR-LLC), on that spectrum may access or negotiate access to a priority indicator c having P(c)=1. For example, an operator may purchase a particular priority indicator c having P(c)=1. A higher probability of P(c) may correspond to more expensive access to the spectrum. This priority indicator may be assigned to all ordered links involved in the UR-LLC service. Link users may attempt to access their links in an order based on their respective priority levels, as described in the examples of FIGS. 6-8. Thus, in the example where UR-LLC links may have a priority indicator with P(c)=1 may provide UR-LLC communication with first priority access to the links. The CCA frame duration may need to be sufficiently smaller than the LLC delay requirement P(c)=1 may also be used to implement vertical sharing across operators. For example, P(c)=1 may be extended to multi-level vertical sharing, with certain priority indicators permanently assigned the best few priority levels. Horizontal sharing may be underplayed, with time-varying (e.g., round-robin/pseudo-priority indicator) priority mapping for other priority indicators.

Figure 6:
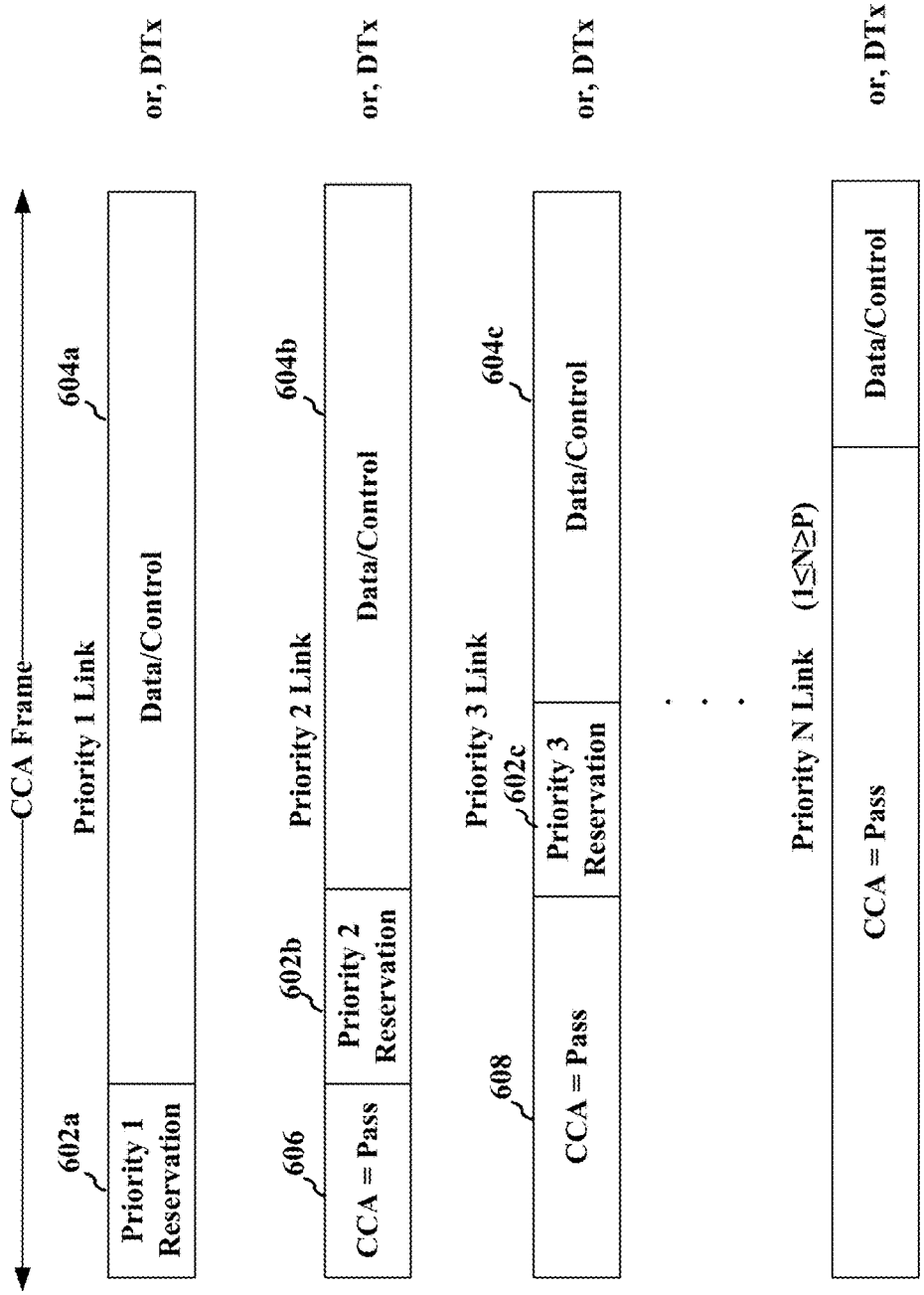
FIG. 6 illustrates an example of sequential prioritized, opportunistic medium access.
Figure 8:
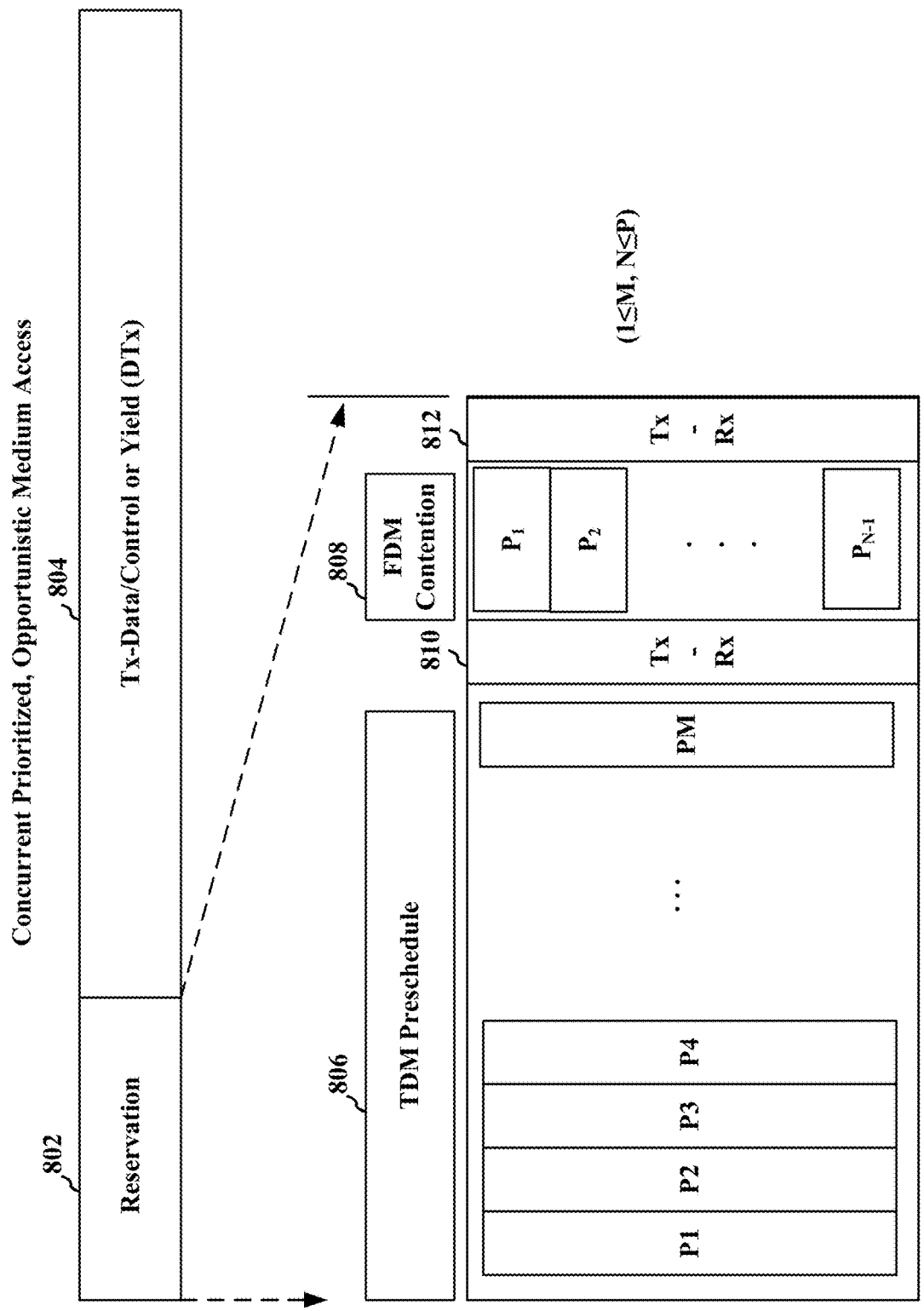
FIG. 8 illustrates an example of concurrent prioritized, opportunistic medium access.

Thus, each device may access the spectrum in an order of priority. FIG. 6 and FIG. 8 illustrate two different examples of prioritized access to the spectrum.

FIG. 6 illustrates a sequential reservation approach in which different devices attempt to reserve the link using sequential reservations in a prioritized manner. Each frame may have certain fields, e.g., a reservation portion 602a, 602b, 602c, that may be used for contending for access to the channel and other fields for transmitting data on the channel, e.g., data/control portion 604a, 604b, 604c. Thus, a device may first attempt to reserve the channel. If successful in reserving the channel, the device may then proceed to transmit data on the channel. In FIG. 6, the link with the highest level of priority for the frame, e.g., Priority 1 link, has the first opportunity to reserve the channel at the priority 1 reservation portion 602a of the frame. A device for the Priority 1 link may attempt to reserve the channel, e.g., through a CCA procedure, including transmitting a reservation signal. Additional details about an example reservation procedure are described in connection with FIG. 7. If the Priority 1 link successfully reserves the channel at 602a, the Priority 1 link may then continue to transmit data at 604a.

However, if the device for the Priority 1 link did not have data to transmit and did not reserve the channel at 602a, then the link with the next highest priority level for the frame, e.g., Priority 2 link, has an opportunity to reserve the channel at the priority 2 reservation portion 602b of the frame. If a device for the Priority 2 link successfully reserves the channel at 602b, the Priority 2 link device may then continue to transmit data at 604b.

In one example, if the device for the Priority 2 link detects a reservation at 202a, then, the device for the Priority 2 link may refrain from attempting to reserve the channel and may refrain from transmitting data. The device for the Priority 2 link may wait until a next slot to listen, again for a reservation of the channel. In another example, the device for the Priority 2 link may determine whether or not to attempt to reserve the channel based on the strength of a reservation signal that it receives from the Priority 1 link. For example, if the reservation signal is weak, and falls below a threshold power, the device for the Priority 2 link may determine that the two links may coexist and may transmit a reservation signal at 202b. If the reservation signal received from the Priority 1 link is above the threshold, the device for the Priority 2 link may determine that the two links cannot coexist and would cause an unacceptable amount of interference to each other. The device for the Priority 2 link would then refrain from attempting to reserve the channel and would refrain from transmitting data on the channel.

Similarly, if the device for the Priority 2 link did not have data to transmit and did not reserve the channel at 602b, then the link with the next highest priority level for the frame, e.g., Priority 3 link, has an opportunity to reserve the channel at the priority 3 reservation portion 602c of the frame. If a device for the Priority 3 link successfully reserves the channel at 602c, the device for the Priority 3 link may then continue to transmit data at 604c. This sequential access procedure may continue for lower level priority links when they do not detect a higher priority link reserving the channel for N levels of prioritized links, e.g., where $1 \leq N < P$, P being the priority of the current link. Thus, the frame may comprise N−1 reservation contention slots per CCA frame. The higher the priority of the current link has, the smaller the reservation contention overhead that the current link incurs. If the current link has the lowest priority, the current link may incur the CCA overhead with N−1 reservation contention slots.

The choice of CCA frame duration may be governed by latency considerations. A choice of N, which may be less than or equal to P, may be governed by interference, e.g., based on an interference map or a jamming map. The choice of N may also be based on overhead consideration.

Figure 7:
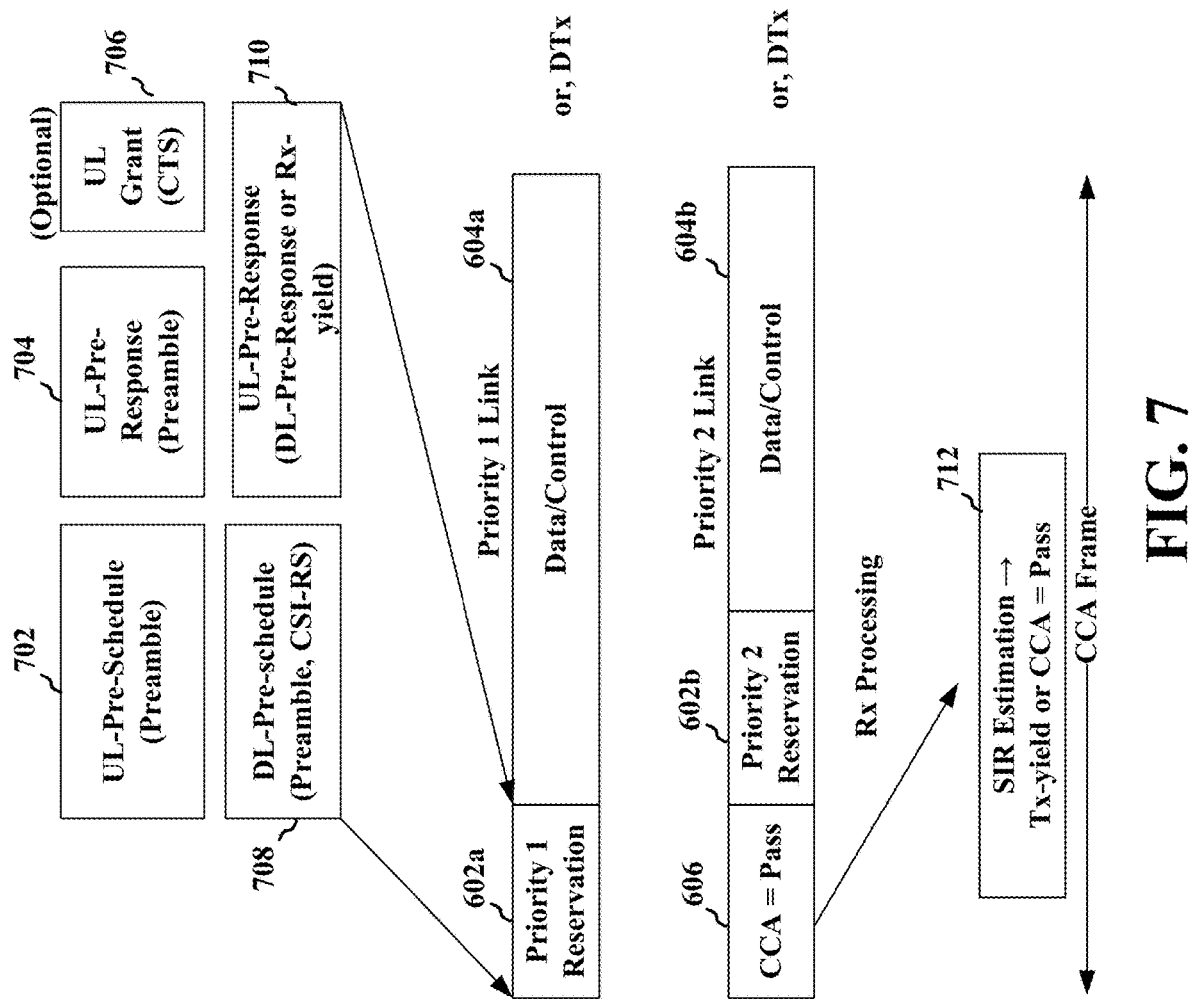
FIG. 7 illustrates example transmissions during a reservation slot.

FIG. 7 illustrates examples of communication that may be transmitted in the reservation slot, e.g., 602a, 602b, 602c. For uplink communication, a base station, e.g., 406a-g or other scheduler, e.g., 408, etc., may transmit an uplink preschedule signal 702. The transmitter, e.g., UE 410a-d or other uplink transmitter 412, may transmit a response 704, e.g., an uplink pre-response. The uplink pre-response may comprise an SRS and preamble in response to the uplink pre-schedule preamble. The base station may optionally transmit an uplink grant 706 to the UE, e.g., comprising a clear to send (CTS) indication. For downlink reservations, a base station may transmit a downlink pre-schedule signal 708 that may comprise, e.g., a preamble and/or CSI-RS. The UE or other downlink receiver may transmit a downlink pre-response 710 that may comprise, e.g., a CQI, a CTS indication, or a reception yield indication. The CQI may indicate to the base station that the UE is experiencing too much interference and the base station should schedule a different UE. The UE may similarly indicate this through a reception yield indication.

The determination by lower level priority links as to whether CCA is passed during a slot 606, 608 corresponding to the reservation slots 602a, 602b of higher priority links may be based on a signal-to-interference ratio (SIR) estimation 712 regarding a received reservation signal during the corresponding slot 606, 608. The UE may determine whether CCA was passed or whether to perform a transmission/reception yield based on the SIR estimation. A transmission yield may include refraining from transmitting a reservation signal and/or data. A reception yield may include signaling a reception yield to a base station.

FIG. 8 illustrates a prioritized, opportunistic medium access procedure using a concurrent approach rather than the sequential approach of FIG. 6. In this example, multiple devices may attempt to reserve the channel during a single reservation slot 802 of the frame. The device that is successful may then proceed to transmit data during the data/control portion 804 of the frame. The reservation portion 802 may include a preschedule portion 806 during which a preschedule signal may be transmitted by a scheduling entity for links having various priority levels in a TDM manner.

FIG. 8 illustrates a preschedule signal being transmitted, e.g., by a base station or other scheduler for an uplink or downlink transmission, for a priority 1 link (P1), a priority 2 link (P2), a priority 3 link (P3), a priority 4 (link), ..., and a priority M link ($P_M$). The pre-schedule signals may be transmitted by scheduling nodes or master nodes, such as gNBs 180, 406a-g and relays, in their respective priority slots. The reservation portion 802 may further comprise a contention portion 808 during which a contention signal may be transmitted for each link for which a pre-schedule signal was transmitted at 806. The contention signals may be transmitted by pre-schedule receivers, such as UEs for the uplink and gNBs for the downlink. The contention portion may include the contention signals transmitted in an FDM manner, rather than the TDM manner of the pre-schedule portion. Contention signals may carry information regarding path-loss and tolerable Interference over Thermal (e.g. the tolerable interference level) from lower priority links. The contention signals may be received and processed by the preschedule transmitters in order to make transmission/reception yield determinations. In one example, M may be different than N where M represents the priorities among the TDM scheduling. This means that there could be M priorities in the TDM prescheduling where multiple priority link could be prescheduled at the same time with the same priority in the TDM scheduling while the actual data transmission can have N priorities. For example, with dynamic TDD, the downlink and uplink data transmission may have different priorities (e.g., DL data transmission may have a higher priority over uplink data transmission on a given frame or vice versa) while the TDM preschedule for downlink and uplink transmissions can happen at the same time with the same priority.

A switching portion for switching between transmission and reception may be provided in the frame, e.g., at 810, 812.

The concurrent example of FIG. 8 may provide a trade-off in robustness and overhead. In one option, different priorities may be overloaded onto the same time-frequency resources. In this case, only the strongest signal may be heard by the intended receivers. This may be adequate for single-operator dynamic TDD.

In one example, priority indicators may be assigned to links so that at most one operator can provide UR-LLC service on a given spectrum or band.

Different deployments may need to agree upon the PHY-MAC waveforms and procedures associated with the reservation slots. Different deployment may employ different and/or proprietary air-interfaces over the data/control segment, e.g., 604a, 604b, 604c, 804 of the CCA frames. However, having a common reference signal (RS) and interference management resources (IMR) may facilitate robust interference estimation and link adaptation. A common numerology with a common CP length, symbol duration and subcarrier spacing may be employed in the data/control segments.

Even reservation slots, e.g., 602a, 602b, 602c, 802, could include data/control, in addition to reservation-specific waveform components (pilots, preamble, RTS/CTS etc.) recognized by all other nodes.

Adjacent channels in the same band may be subject to a common medium access/reservation instance. Independent medium access may require large guard bands.

Figure 9:
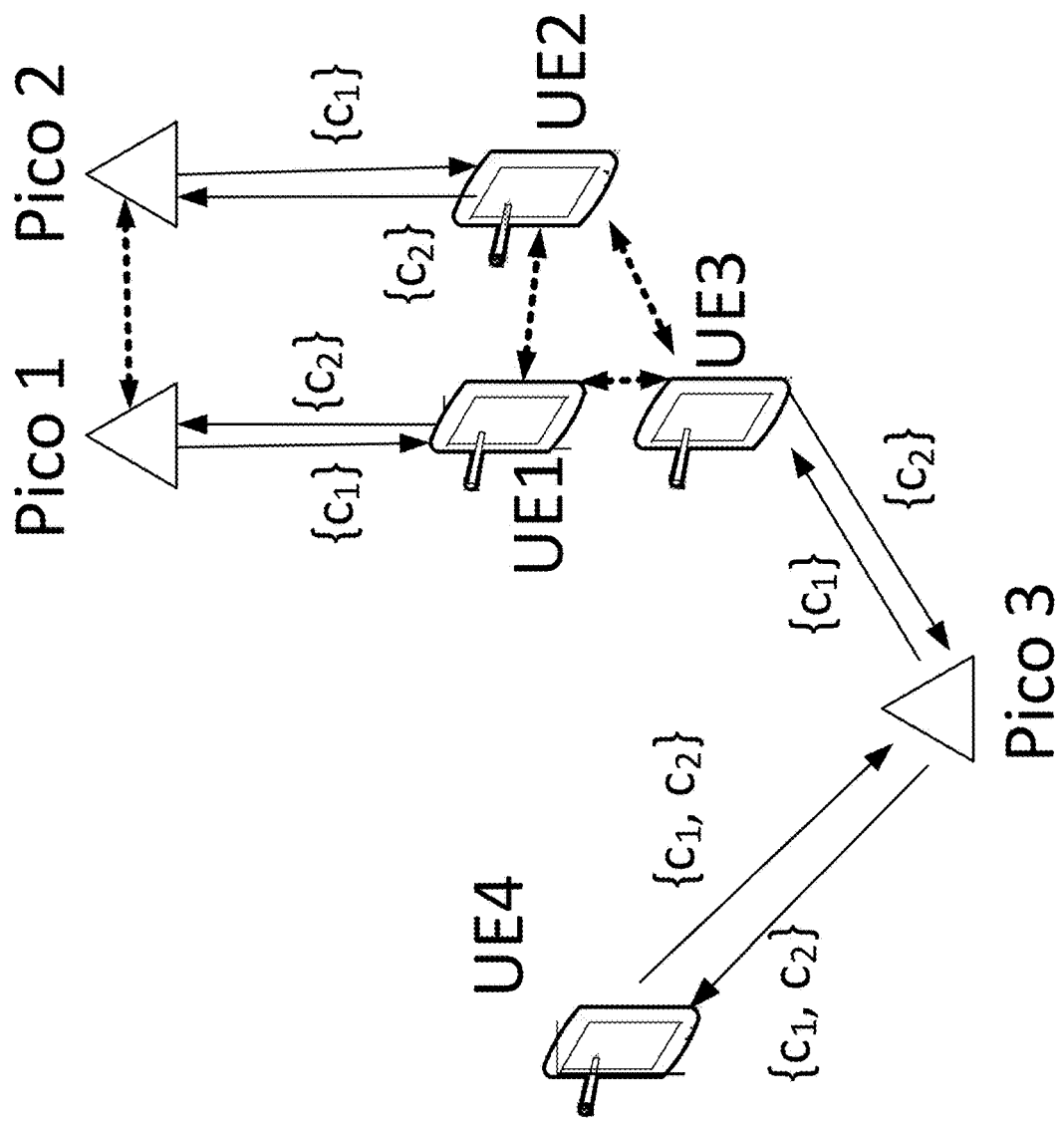
FIG. 9 illustrates an example of a shared spectrum system using assigned priority indicators for links.

FIG. 9 illustrates an example similar to the example of FIG. 5 that includes an exclusive spectrum. An exclusive spectrum may be provided for a single operator deployment, where the SAS functionality described in connection with FIG. 4, may be subsumed in the operator's core network, e.g., 404a, 404b, 404c. In this homogenous example, reuse may be employed, e.g., as may be deployed in a homogenous network in the licensed band, as UE will be always associated with the strongest cell. In this example, downlink control and data transmissions from all cells can happen at the same time as can the UL control and data transmissions. In FIG. 9, the downlink link between UE 1 and pico 1, between UE 2 and pico 2, and between pico 3 and UE 3 are each assigned $c_1$. Similarly, the corresponding uplink links are each assigned $c_2$. Thus, the uplink links are capable of coexistence and the downlink links are capable of coexistence. Both the uplink link and the downlink link between UE 4 and pico 3 are assigned both $c_1$ and $c_2$. Thus, these links are capable of co-existence with each of the other uplink links and downlink links. This example may include dynamic TDD deployment using a limited number of priority indicators, e.g., two priority indicators $c_1$, $c_2$. In this example, M=1 and N=2 may be sufficient. A single reservation slot may be used, e.g., as illustrated in FIG. 8, even in the sequential MAC in this example.

Figure 10:
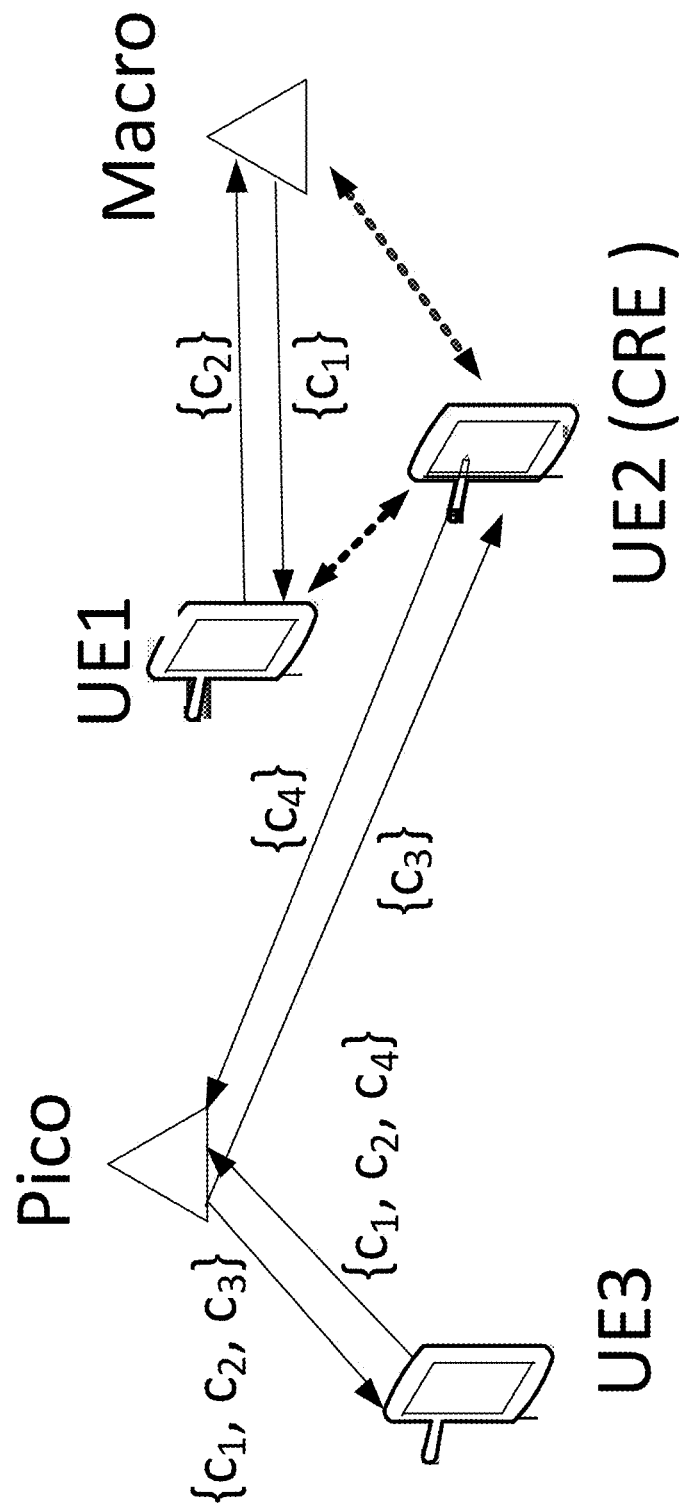
FIG. 10 illustrates an example of a shared spectrum system using assigned priority indicators for links.

FIG. 10 illustrates another example of network priority indicators for a single operator HetNet with static TDD. A HetNet may involve a communications network comprising a combination of different cell types and different access technologies. In this example, four priority indicators are used ($c_1$, $c_2$, $c_3$, $c_4$), M=1 and N=2. This is only an example, and other amounts of priority indicators may be used. Links between UE 1 and the macro base station each have a single priority indicator, e.g., $c_2$ for uplink and $c_1$ for downlink. Similarly, links between UE 2 and the pico base station are assigned a single priority indicator, e.g., $c_4$ for uplink and $c_3$ for downlink. The meta-links for UE 1 and UE 2 cannot coexist and are each assigned disjointed priority indicators. UE 3 served by the pico base station is assigned three priority indicators, e.g., $c_1$, $c_2$, and $c_3$ for downlink and $c_1$, $c_2$, and $c_4$ for uplink. $C_3$ overlaps the downlink link between UE 2 and the pico and the downlink link between UE 3 and the pico. Similarly, $c_4$ overlaps the uplink link for both UE 2 and UE 3. Thus, this links may be capable of co-existence. In this example, a single reservation slot suffices having a priority mapping function $f(t,c_2)=0=f(t,c_4)$ on downlink frames and priority mapping function $f(t,c_1)=0=f(t,c_3)$ on uplink frames. For example, even though priority indicators ($c_1$, $c_2$, $c_3$, $c_4$) are defined, only two distinct priorities are needed for data transmission, which means that a single reservation slot is enough. With static TDD, this is achieved by assigning the priority mapping function $f(t,c_2)=0=f(t,c_4)$ on downlink frames and priority mapping function $f(t,c_1)=0=f(t,c_3)$ on uplink subframes. That is, in a given downlink subframe, only the link between $c_1$ and $c_3$ need to be resolved, as they cannot co-exist because the macro downlink transmission may cause interference to the pico DL reception. Hence, depending on the priority mapping function of $f(t,c_1)$ and $f(t,c_3)$ in a given downlink subframe, the pico cell or the macro cell may access the medium for downlink data transmission. Similarly, in a given uplink subframe, only the link between $c_2$ and $c_4$ need to be resolved, as UE2's uplink transmission may cause interference on UE1's UL data transmission. Hence, depending on the priority mapping function of $f(t,c_2)$ and $f(t,c_4)$ in a given uplink subframe, the pico cell or the macro cell may access the medium for UL data transmission.

Figure 11:
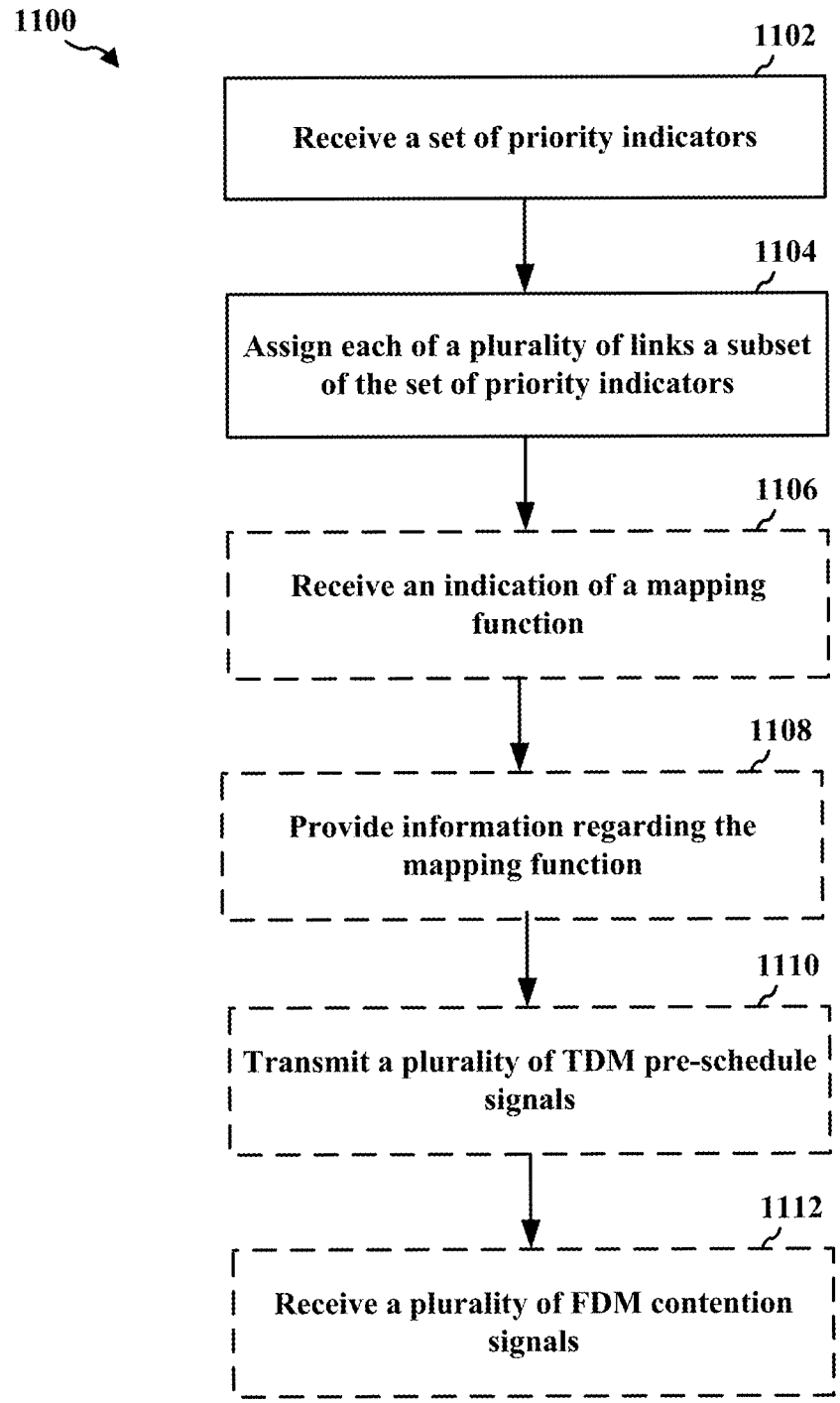
FIG. 11 is a flowchart of a method of wireless communication.

FIG. 11 is a flowchart 1100 of a method of wireless communication. The method may be performed by a scheduling entity such as a base station or master node, e.g., base station 102, 310 gNB 180, 406a-g, master node 408, the apparatus 1202/1202') communicating with a plurality of UEs, e.g., UE 104, 350, 410a-d, 1250, over a plurality of links. Optional aspects of FIG. 11 are illustrated with a dashed line. At 1102, the scheduling entity receives a set of priority indicators, the priority indicators corresponding to time varying priorities for communicating over the plurality of links. The scheduling entity may receive the set of priority indicators from a system access server. The priority indicators may be received from the system access server via an operator core network, for example.

The priority indicator value is merely a descriptor for a tag, label, field, value, rank, index, or other indication that enables different indicator values to be provided to a plurality of links in order to determine a time varying priority level for each of the links per frame. In one example, the priority indicator may comprise a color value. A priority for each of the set of priority indicators may be based on a global priority function and a subset of candidate input arguments input in to the global priority function.

At 1104, the scheduling entity assigns each of the plurality of links a subset of the set of priority indicators, e.g., as illustrated in the example in FIG. 4. Each priority indicator may map to a time varying priority level for the communication during each of a plurality of frames. The subset of priority indicators may be assigned to each of the plurality of links at 1104 based on at least one of an interference topology and a signal characteristic for a corresponding link.

At 1106, the scheduling entity may receive an indication of a mapping function, e.g., $f$ for determining the corresponding priority level for each priority indicator according to a frame number. Although priority indicator subsets may be provided only conceptually down to UEs or slave nodes, the UEs may need to know the time-varying priority for each of their links in order to know at which CCA slot to look for preamble transmission, perform detection, etc. For example, in FIG. 6, the nodes with a priority 3 link (both master and slave) need to attempt to detect a preamble transmitted on the CCA slot for the priority 1 link and the CCA slot for the priority 2 link in order to determine whether the UE/scheduling entity is able to attempt to reserve the channel. Similarly, in the example in FIG. 8, a UE needs to know when the TDM preschedule will be transmitted. Additionally, the UE's transmission/reception yielding decision may also be based on a priority of a detected signal transmitted on the FDM contention slot in comparison to the priority for the UE's own link. A lower priority node may need to determine its transmission parameters based on the detection of the FDM contention signal from higher priority nodes. Thus, the UE may need to be aware of the time-varying priority of its link(s). Thus, at 1108, the scheduling entity may provide information regarding the mapping function to a UE, slave node, etc.

A priority mapping for each priority indicator to the corresponding priority level may comprise varying priority levels for different frames for each priority indicator. For example, the mapping function may provide a round robin type patter of varying priority that gives each of the priority indicators higher and lower priority levels for different frames so that links assigned each of the different priority indicators may have similar access to the spectrum. In another example, the priority mapping for each priority indicator to the corresponding priority level may comprises a same priority level for different frames. The priority mapping for each priority indicator to the corresponding priority level may comprise a pseudo-random mapping per frame, which enables certain operators or scheduling entities to gain greater access to the spectrum.

When a first subset of the set of priority indicators for a first link is disjoint from a second subset of priority indicators for a second link, first communication for the first link may be time division multiplexed with second communication for the second link. However, when a first subset of the set of priority indicators for a first link comprises an overlapping priority indicator with a second subset of priority indicators for a second link, first communication for the first link may be communicated simultaneously with second communication for the second link.

The communication for a first link of the plurality of links for a first frame may be performed according to a highest priority level from among the subset of priority indicators assigned to the first link for the first frame.

Reservations for each of the plurality of links for a frame may be performed using a sequential reservation procedure according to the priority level for the subset of priority indicators assigned to each of the plurality of links, e.g., as illustrated in connection with FIG. 6. Alternatively, reservations for each of the plurality of links for a frame may be performed using a concurrent reservation procedure according to the priority level for the subset of priority indicators assigned to each of the plurality of links, as described in connection with FIG. 8. In this example, the scheduling entity may transmit a plurality of TDM pre-schedule signals at 1110, wherein the pre-schedule signals are TDM according to the priority level for the subset of priority indicators assigned to a corresponding link of the plurality of links. Then, the scheduling entity may receive a plurality of frequency division multiplexed contention signals in a same time period in response to the pre-schedule signals at 1112.

Figure 12:
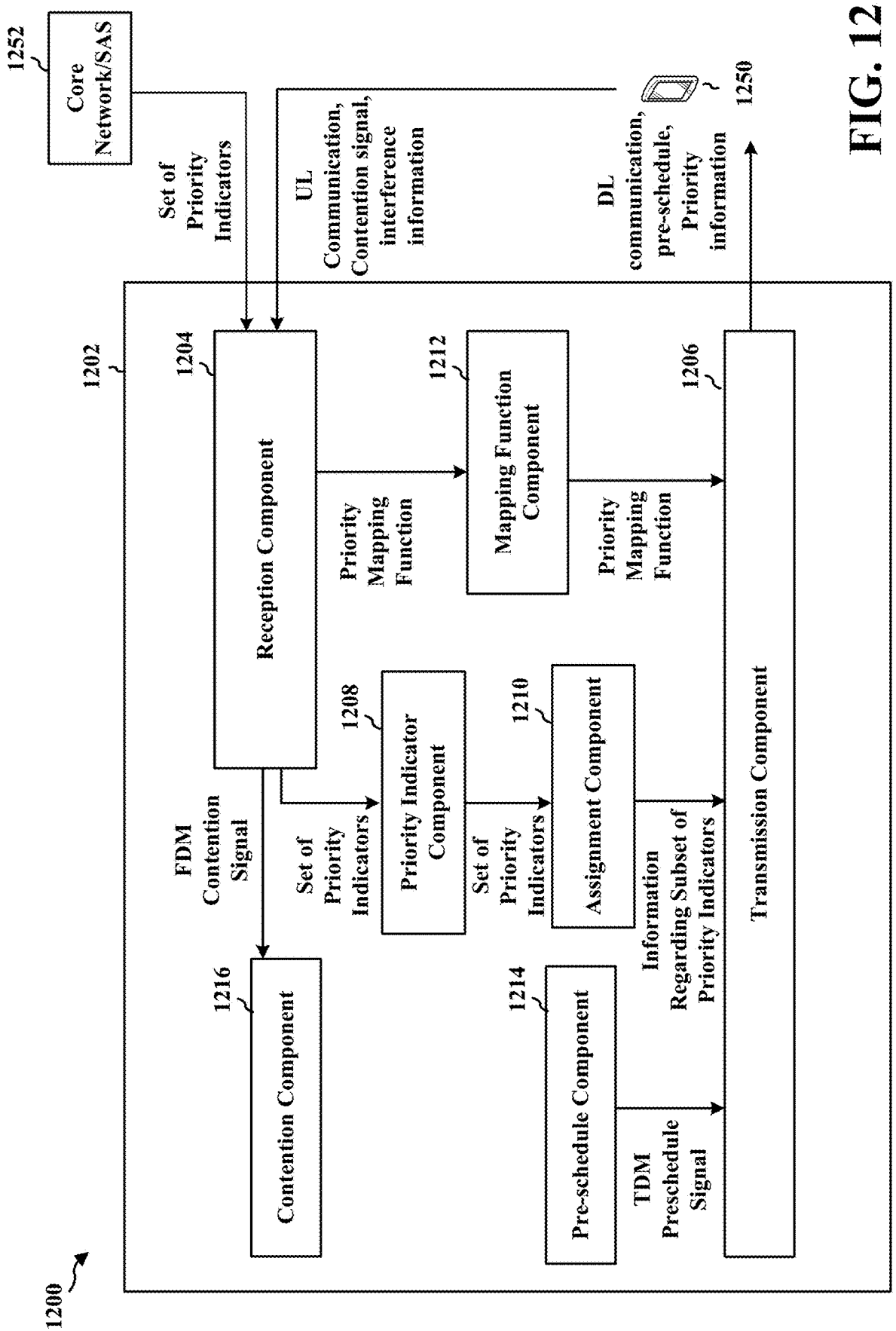
FIG. 12 is a conceptual data flow diagram illustrating the data flow between different means/components in an exemplary apparatus.

FIG. 12 is a conceptual data flow diagram 1200 illustrating the data flow between different means/components in an exemplary apparatus 1202. The apparatus may be a scheduling entity, e.g., base station, eNB, gNB, master node, e.g. 102, 180, 310, 406a-g, 408, communicating wirelessly with a UE or slave node (e.g., UE 104, 350, 410 a-d, slave node 412). The apparatus includes a reception component 1204 that receive UL communication from an entity being scheduled 1250, e.g., as UE or slave node. Although only a single entity 1250 is illustrated, the scheduling entity may serve a plurality of such entities, e.g., as illustrated in FIG. 4. The reception component 1204 may also receive communication from a core network operator or a SAS 1252. The apparatus 1202 includes a transmission component 1206 that transmits downlink communication to the entities 1250 being scheduled. The apparatus 1202 may include a priority indicator component 1208 configured to receive a set of priority indicators, the priority indicators corresponding to time varying priorities for communicating over the plurality of links. The apparatus 1202 may include an assignment component 1210 configured to assign each of the plurality of links a subset of the set of priority indicators, wherein each priority indicator maps to a time varying priority level for the communication during each of a plurality of frames. Communication with the UE 1250 may be based on the time-varying priority for the assigned subset of priority indicators. The apparatus may include a mapping function component 1212 configured to receive an indication of a mapping function for determining the corresponding priority level for each priority indicator according to a frame number. The mapping function component 1212 may provide priority information to the UE 1250. The apparatus may include a pre-schedule component 1214 configured to transmit a plurality of TDM preschedule signals, e.g., as described in the example of FIG. 8. The apparatus may include a contention component 1216 configured to receive a plurality of frequency division multiplexed contention signals, such as described in the example of FIG. 8.

The apparatus may include additional components that perform each of the blocks of the algorithm in the aforementioned flowchart of FIG. 11, and the aspects illustrated in FIGS. 4-10. As such, each block in the aforementioned flowchart of FIG. 11, and the aspects illustrated in FIGS. 4-10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
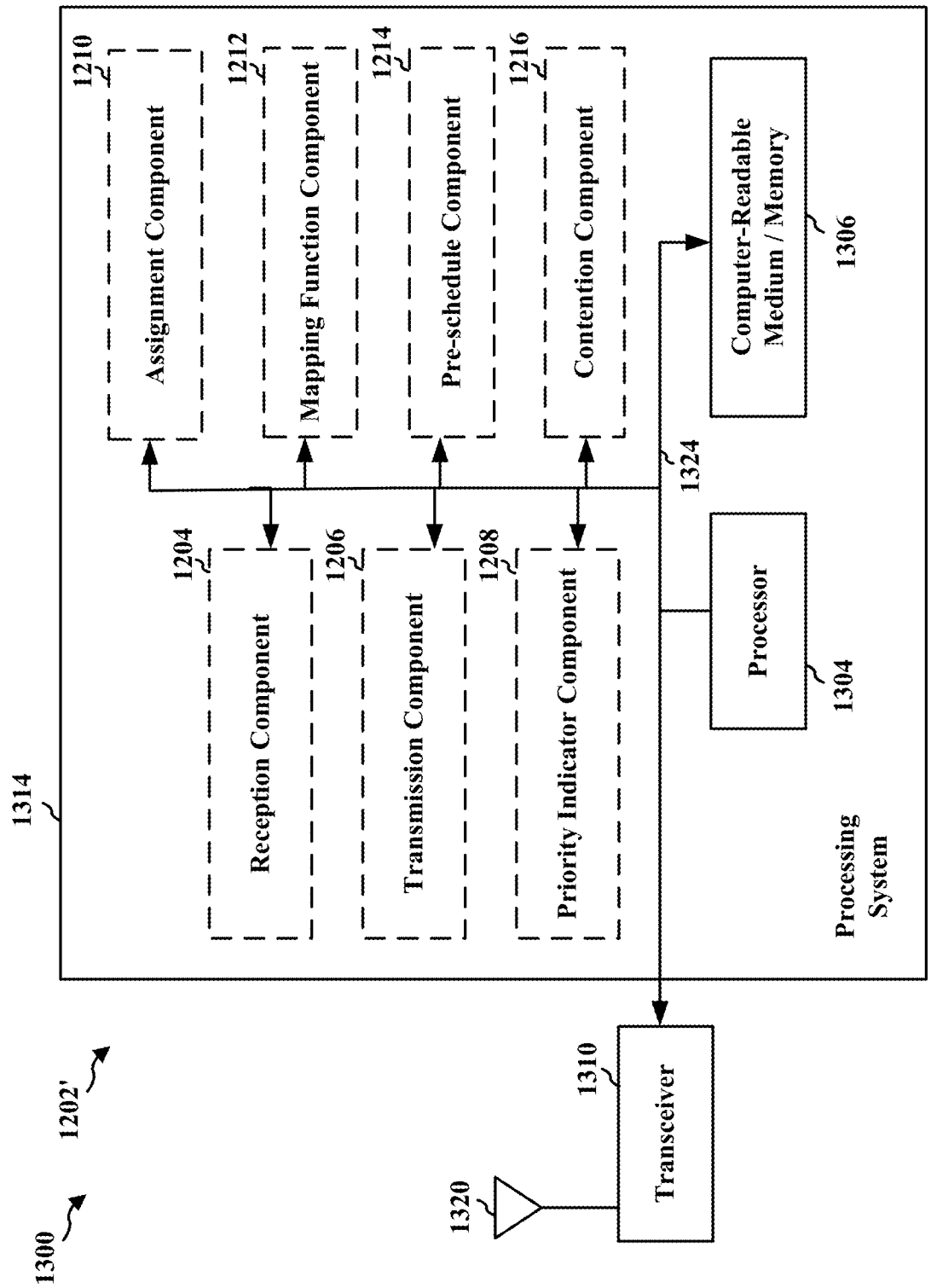
FIG. 13 is a diagram illustrating an example of a hardware implementation for an apparatus employing a processing system.

FIG. 13 is a diagram 1300 illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206, 1208, 1210, 1212, 1214, 1216, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1304. In addition, the transceiver 1310 receives information from the processing system 1314, specifically the transmission component 1306, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206, 1208, 1210, 1212, 1214, 1216. The components may be software components running in the processor 1304, resident/stored in the computer readable medium/memory 1306, one or more hardware components coupled to the processor 1304, or some combination thereof. The processing system 1314 may be a component of the base station 310 and may include the memory 376 and/or at least one of the TX processor 316, the RX processor 370, and the controller/processor 375.

In one configuration, the apparatus 1202/1202' for wireless communication includes means for receiving a set of priority indicators, means for assigning each of the plurality of links a subset of the set of priority indicators, means for receiving an indication of a mapping function for determining the corresponding priority level for each priority indicator according to a frame number, means for transmitting a plurality of TDN pre-schedule signals, and means for receiving a plurality of frequency division multiplexed contention signals. The aforementioned means may be one or more of the aforementioned components of the apparatus 1202 and/or the processing system 1314 of the apparatus 1202' configured to perform the functions recited by the aforementioned means. As described supra, the processing system 1314 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a scheduling entity communicating with a plurality of UEs over a plurality of links, comprising:

receiving a set of priority indicators from a system access server, the set of priority indicators corresponding to time varying priority levels for communicating over the plurality of links;

assigning each of the plurality of links a subset of multiple priority indicators from the set of priority indicators, wherein each priority indicator in the subset maps at a given time to a priority level for a communication that includes a plurality of frames over a respective link of the plurality of links, each priority indicator in the subset mapping a higher level of priority to at least one frame of the plurality of frames than to another frame of the plurality of frames associated with the respective link;

determining a highest priority level for the respective link at a given frame based on the subset of multiple priority indicators assigned to the respective link; and transmitting or receiving the communication for the respective link according to the highest priority level determined for the respective link at the given frame.

2. The method of claim 1, further comprising:

receiving an indication of a mapping function for determining the priority level for each priority indicator according to a frame number.

3. The method of claim 1, wherein the mapping for each priority indicator to the respective priority level comprises a mapping of a same priority level for at least some different frames of the plurality of frames.

4. The method of claim 1, wherein the mapping for each priority indicator to the respective priority level comprises a mapping of a pseudo-random priority level for at least some different frames of the plurality of frames.

5. The method of claim 1, wherein when a first priority indicator for a first link of the plurality of links is disjoint from a second priority indicator for a second link, the method further comprises:

transmitting or receiving the respective communication for the first link in a time-division-multiplexed manner with the respective communication for the second link.

6. The method of claim 1, wherein when a first priority indicator for a first link is the same as a second priority indicator for a second link, the method further comprises:

transmitting or receiving the respective communication for the first link at a same time as the respective communication for the second link.

7. The method of claim 1, wherein the subset of multiple priority indicators are assigned to each of the plurality of links based on at least one of an interference topology or a signal characteristic of the respective link.

8. The method of claim 1, further comprising:

performing a reservation procedure using a sequential reservation procedure according to the priority level for the respective link.

9. The method of claim 1, further comprising:

performing a reservation procedure using a concurrent reservation procedure according to the priority level for a priority indicator assigned to the respective link.

10. The method of claim 9, further comprising:

transmitting a plurality of time-division-multiplexed pre-schedule signals for one or more of the plurality of links, wherein the plurality of pre-schedule signals are time-division-multiplexed according to the priority level for the priority indicator assigned to the respective link.

11. The method of claim 10, further comprising:
receiving a plurality of frequency-division-multiplexed contention signals in a same time period in response to the plurality of pre-schedule signals.

12. The method of claim 1, wherein the priority level for each priority indicator is based on a global priority function.

13. The method of claim 1, wherein each priority indicator comprises a color value.

14. An apparatus for wireless communication at a scheduling entity communicating with a plurality of UEs over a plurality of links, comprising:
means for receiving a set of priority indicators from a system access server, the set of priority indicators corresponding to time varying priority levels for communicating over the plurality of links;
means for assigning each of the plurality of links a subset of multiple priority indicators from the set of priority indicators, wherein each priority indicator in the subset maps at a given time to a priority level for a communication that includes a plurality of frames over a respective link of the plurality of links, each priority indicator in the subset mapping a higher level of priority to at least one frame of the plurality of frames than to another frame of the plurality of frames associated with the respective link;
means for determining a highest priority level for the respective link at a given frame based on the subset of multiple priority indicators assigned to the respective link; and
means for transmitting or receiving the communication for the respective link according to the highest priority level determined for the respective link at the given frame.

15. The apparatus of claim 14, further comprising:
means for receiving an indication of a mapping function for determining the priority level for each priority indicator according to a frame number.

16. The apparatus of claim 14, further comprising:
means for transmitting a plurality of time-division-multiplexed pre-schedule signals for one or more of the plurality of links, wherein the plurality of pre-schedule signals are time-division-multiplexed according to the priority level for a priority indicator assigned to the respective link.

17. The apparatus of claim 16, further comprising:
means for receiving a plurality of frequency-division-multiplexed contention signals in a same time period in response to the plurality of pre-schedule signals.

18. An apparatus for wireless communication at a scheduling entity communicating with a plurality of UEs over a plurality of links, comprising:
a memory; and
at least one processor coupled to the memory and configured to:
receive a set of priority indicators from a system access server, the set of priority indicators corresponding to time varying priority levels for communicating over the plurality of links;
assign each of the plurality of links a subset of multiple priority indicators from the set of priority indicators, wherein each priority indicator in the subset maps at a given time to a priority level for a communication that includes a plurality of frames over a respective link of the plurality of links, each priority indicator in the subset mapping a higher level of priority to at least one frame of the plurality of frames than to another frame of the plurality of frames associated with the respective link;
determine a highest priority level for the respective link at a given frame based on the subset of multiple priority indicators assigned to the respective link; and
transmit or receive the communication for the respective link according to the highest priority level determined for the respective link at the given frame.

19. The apparatus of claim 18, wherein the at least one processor is further configured to:
receive an indication of a mapping function for determining the priority level for each priority indicator according to a frame number.

20. The apparatus of claim 18, wherein the at least one processor is further configured to:
transmit a plurality of time-division-multiplexed pre-schedule signals for one or more of the plurality of links, wherein the plurality of pre-schedule signals are time-division-multiplexed according to the priority level for a priority indicator assigned to the respective link.

21. The apparatus of claim 20, wherein the at least one processor is further configured to:
receive a plurality of frequency-division-multiplexed contention signals in a same time period in response to the plurality of pre-schedule signals.

22. A non-transitory computer-readable medium storing computer executable code for wireless communication at a scheduling entity communicating with a plurality of UEs over a plurality of links, the code when executed by a processor causes the processor to:
receive a set of priority indicators from a system access server, the set of priority indicators corresponding to time varying priority levels for communicating over the plurality of links;
assign each of the plurality of links a subset of multiple priority indicators from the set of priority indicators, wherein each priority indicator in the subset maps at a given time to a priority level for a communication that includes a plurality of frames over a respective link of the plurality of links, each priority indicator in the subset mapping a higher level of priority to at least one frame of the plurality of frames than to another frame of the plurality of frames associated with the respective link;
determine a highest priority level for the respective link at a given frame based on the subset of multiple priority indicators assigned to the respective link; and
transmit or receive the communication for the respective link according to the highest priority level determined for the respective link at the given frame.

23. The non-transitory computer-readable medium of claim 22, further comprising code to:
receive an indication of a mapping function for determining the priority level for each priority indicator according to a frame number.

24. The non-transitory computer-readable medium of claim 22, further comprising code to:
transmit a plurality of time-division-multiplexed pre-schedule signals for one or more of the plurality of links, wherein the plurality of pre-schedule signals are time-division-multiplexed according to the priority level for a priority indicator assigned to the respective link.

25. The non-transitory computer-readable medium of claim 24, further comprising code to:
receive a plurality of frequency-division-multiplexed contention signals in a same time period in response to the plurality of pre-schedule signals.

\* \* \* \* \*